INVENTOR
DAVID N. EDWARDS
WALTER G. STEN
BY
Curtis Morris & Safford
ATTORNEYS

April 15, 1958    D. N. EDWARDS ET AL    2,830,416
BOTTLE CASING MACHINE
Filed Feb. 9, 1954    5 Sheets-Sheet 4

INVENTOR
DAVID N. EDWARDS
WALTER G. STEN.
BY
Curtis, Morris & Safford
ATTORNEYS

April 15, 1958 D. N. EDWARDS ET AL 2,830,416
BOTTLE CASING MACHINE
Filed Feb. 9, 1954 5 Sheets-Sheet 5

INVENTOR
DAVID N. EDWARDS
WALTER G. STEN
BY
Curtis Morris & Safford
ATTORNEYS

United States Patent Office 2,830,416
Patented Apr. 15, 1958

2,830,416

BOTTLE CASING MACHINE

David N. Edwards, Greenwich, Conn., and Walter G. Sten, Jackson Heights, N. Y.; said Sten assignor to said Edwards Application February 9, 1954, Serial No. 409,118

10 Claims. (Cl. 53—163)

This invention relates to machines for assembling containers or other articles to be cased into predetermined groups and then putting them into cases in which the group arrangement will be maintained during handling and transportation of the cased containers or other articles. More particularly the invention relates to machines for assembling and putting into cases containers or other articles which require careful handling either because of the nature of the container or article or because of the nature of its contents.

For convenience the term "container," alone, will be used generally hereinafter to designate the articles to be cased by the casing machine of the present invention, since the casing of goods packaged in containers constitutes one of its widest fields of utility, but it will be understood that the use of this term in describing and defining the interrelationship, the operations and the functions of the various cooperating mechanisms which are combined in the casing machine as a whole is not intended to limit the invention to use in casing articles or things packaged in containers.

The invention relates also to a novel case construction which both permits the careful handling of the containers or other articles which may be required while they are being put into the case and also is of such a rugged and shock proof nature that it insures the protection of the containers and their contents or the unpackaged articles on their way to the jobber, retailer and/or ultimate user of the materials shipped therein.

In most container casing machines now in use the containers gravitate freely at least part way to their allotted positions in the cases, this gravitating movement of the containers, where it is controlled at all after the containers have been brought into container inserting position over the case, being sometimes restrained by means engaging the upper part of each container, as for example, the flanged neck of a bottle.

An object of the present invention is to provide a container casing machine in which, while gravity is still employed to effect the movement of the container into the case, there is constant support of the containers throughout their movement down into the case until they rest upon the bottom thereof. More particularly the invention aims to provide container supporting means, operating during the insertion of the containers into the case, which is located beneath and engages the bottoms of the containers and moves downwardly therewith under constant control to lower them into the case, thereby making possible certain control of the downward movement of the containers which are thus constantly supported throughout their movement into seated position in the case.

Another object of the invention is to provide safeguards against the improper operation of the casing machine and particularly to insure its operation only when a case-filling group of containers has been placed in position on the container lowering means and a case is in position to receive the group of containers.

An important feature of the invention is the provision of a shiftable guide rack and temporary container support, the guide rack having a number of container guides therein corresponding to the number of containers to be cased at each operation and each defining the path for a container to its position in the case; the guide rack being shiftable back and forth from its path guiding position to a path blocking position in which it affords a supporting guide for transverse movement of the containers and vice-versa. Cooperating with the guide rack and helping to support the containers during the assembling of a case-filling group and also to insure entrance of the respective containers into the respective guides in the racks are guide walls of container assembling bays, each bay being of such depth as to receive a row of containers of case-width or case-long length, the number of bays corresponding to the number of containers in each case row running transversely thereto.

Another important feature of the invention is the means for pushing successive groups of bottles into the respective bays, such means being constructed and arranged to operate only when there is a container for each bay in position to be pushed thereinto.

Other important features of the invention are the various interlocks. One of these holds the containers confined by a pusher in a case-filling group in the assembling bays, until the assembled group has been lowered through the guide rack. Another keeps a case-feeding device in readiness to feed a case into container-receiving position beneath the container-assembling means, until there is a case in position to be fed. Another prevents the feeding operation of the case feeder to move another case to the filling position until the preceding case has been filled and ejected from said position. Still another prevents the operation of the means for lowering the containers into the case unless there is a case-filling assemblage of containers resting thereon, etc.

Other objects, important features and advantages of the invention to which attention has not hereinabove specifically been directed will appear hereinafter when the following specification and claims are considered in connection with the accompanying drawings in which—

Figure 1 is a perspective view of a casing machine embodying the present invention, with some parts shown in section and other parts partially broken away to expose parts that would be concealed thereby;

Figure 2 is a vertical section through the machine, looking from the case discharge side of the machine. This view, being on a somewhat larger scale than Figure 1, shows one side of a case partly broken away to disclose its interior structure and particularly shows the arrangement which permits the container supporting fingers to be brought into engagement or approximate engagement with the under sides of the containers to be lowered into the case;

Figure 3 is a plan view of the casing machine with parts of the reciprocating rods and their operating pistons and cylinders broken away to permit a larger scale showing of the container assembling mechanism;

Figure 4 is a section on the line 4—4 of Figure 2, this view showing particularly the means for bringing the container receiving case into container receiving position and for ejecting it from the machine after it has received its quota of containers, the case locating pusher being shown as having completed its movement of the case into container receiving position and the retracted position of the pusher being shown in dotted lines;

Figures 5 to 9 inclusive are circuit diagrams of several control circuits used in the machine of Figures 1-4, as follows:

Figure 5 the bottle pusher control;
Figure 6 the bottle guide control;
Figure 7 the bottle lowering control, Figure 8 the case pusher control, and Figure 9 the case ejector control;

Figure 1:
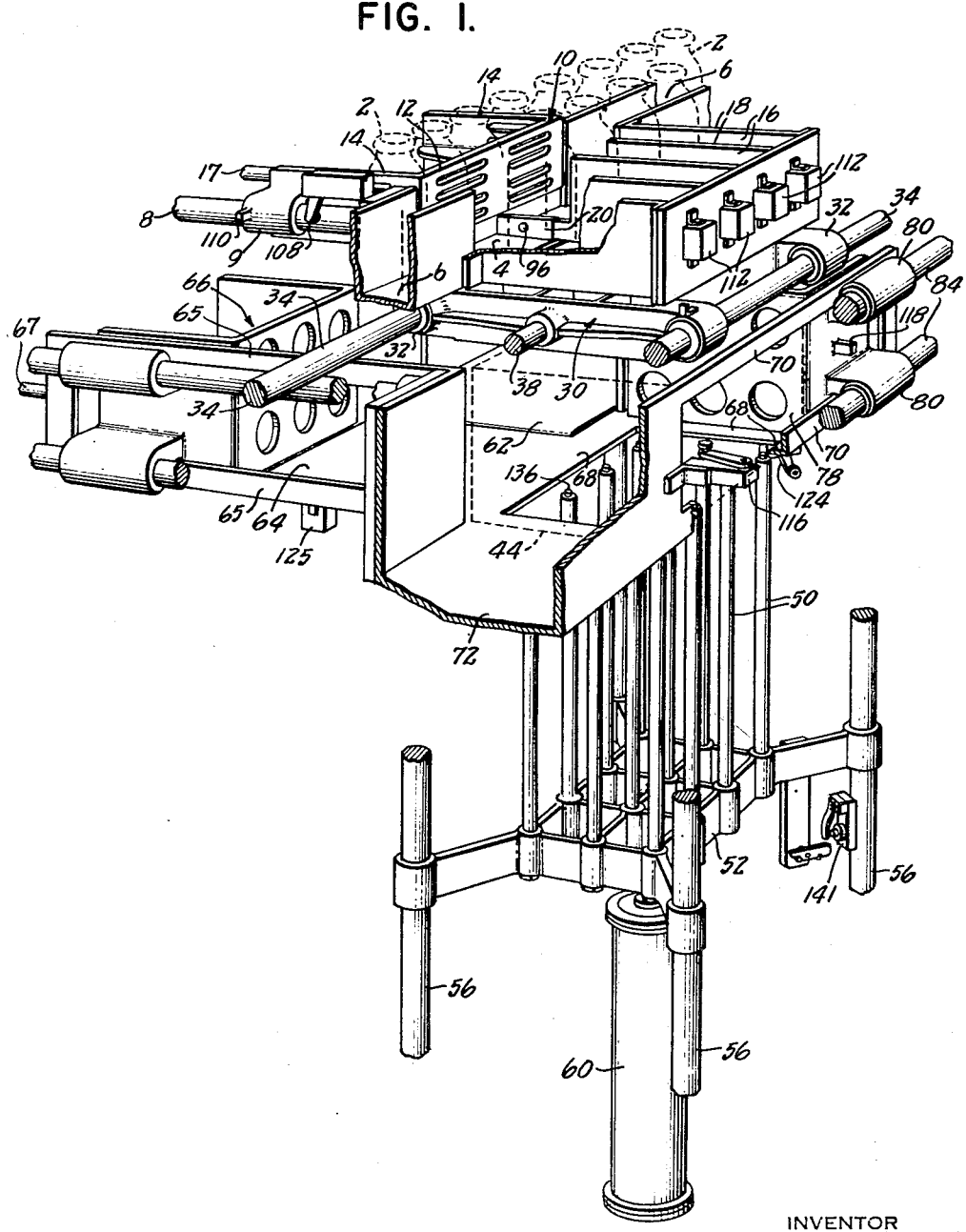

In its illustrative embodiment the casing machine of the present invention is shown as designed for the casing of milk bottles 2 of any usual commercial shape; as shown in the drawings, the bottles have a more or less square body section and a round neck and top. These bottles, filled with milk or other liquid commodity, are brought from the filling and capping machine or machines in two oppositely disposed lines to the two ends of a row-assembling table 4, for example, on conveyors which end in the horizontal alleys 6 shown immediately adjacent to the two ends of the table 4. Thus bottles from each alley 6 can be fed onto table 4, when the parts are in bottle receiving position.

Guide rails 8 mount the sliding bearings 9 of a bottle pusher 10 reciprocating across the row-assembling surface of the table 4, in a direction transverse to the incoming bottle row. The pusher 10 has a bottle engaging front 12 and sides 14 which stop the bottles in the alleys 6 when the pusher 10 is pushing bottles into the assembling bays 16 and until it has returned to bottle-receiving position.

The pusher 10 is driven by pneumatic motor means 98 (Figure 5) connected through the piston rod 17 to the pusher 10.

The bays 16 are defined by lateral walls 18 and an end wall 28. The ends of the walls 18 adjacent to the table 4 may be tapered to facilitate the guiding of the bottles into the bays, although the round bottles or rounded corners of their body sections will usually assure entry without special precautions.

The center partition 18 has, extending therefrom across table 4, a low abutment 20, against which the oppositely feeding rows of bottles are stopped to position them in front of the respective bays 16.

Each of these row-assembling bays is of width equal to one bottle plus necessary clearance and of length equal to the number of bottles in the corresponding dimension of the case when packed, three bottles, as illustrated, thus making a case-filling assembly comprise the usual twelve bottles.

The bays 16 have no bottoms; but a shiftable temporary support guide 30 holds the bottles as they are pushed in.

Figure 2:
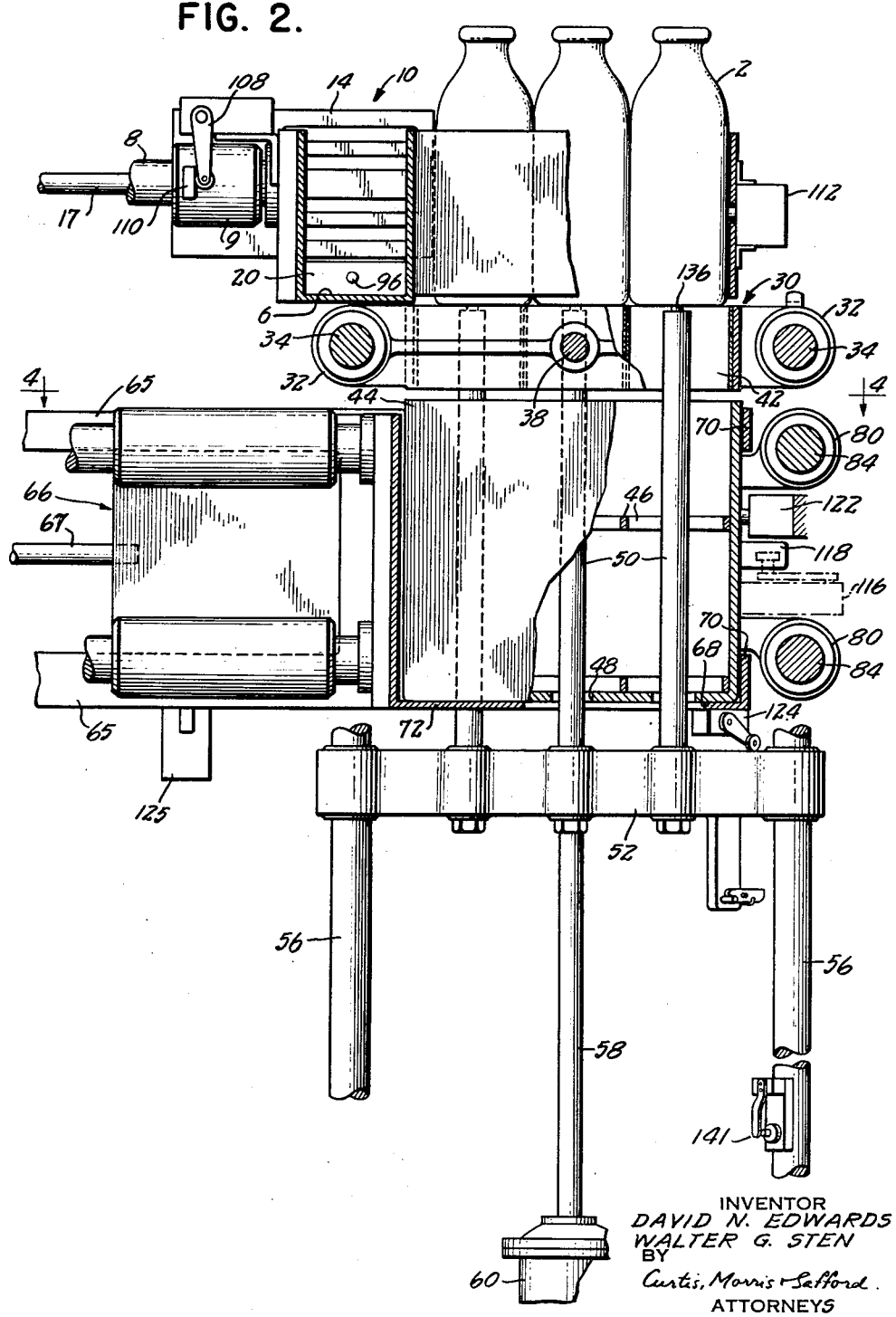
Figure 8:
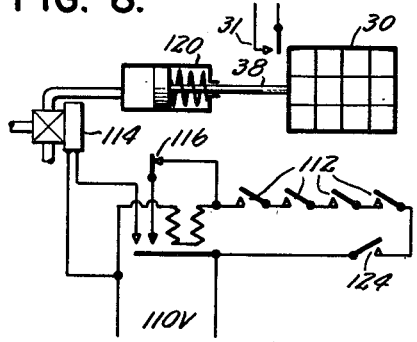

The support guide 30 comprises a rectangular frame provided with pairs of ears 32 (see Fig. 2) projecting from the two sides thereof and serving to mount the support guide slidably on rails 34. A suitable motor, advantageously a pneumatic piston and cylinder 120 (Figure 8), serves to effect the shifting movement of the support 30 between its bottle supporting position and its guiding position. A normally open switch 31 senses the return of guide support 30 to its supporting position.

Figure 3:
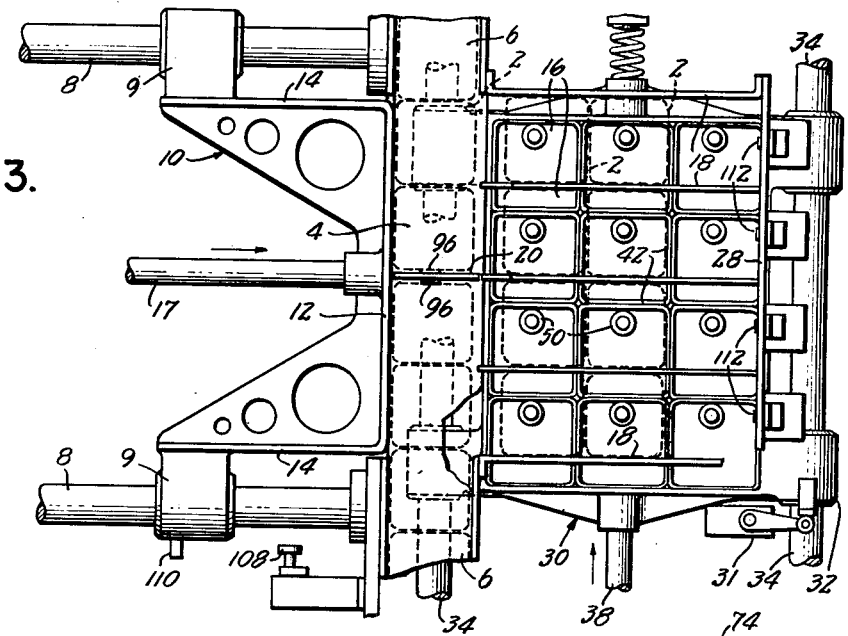
Figure 4:
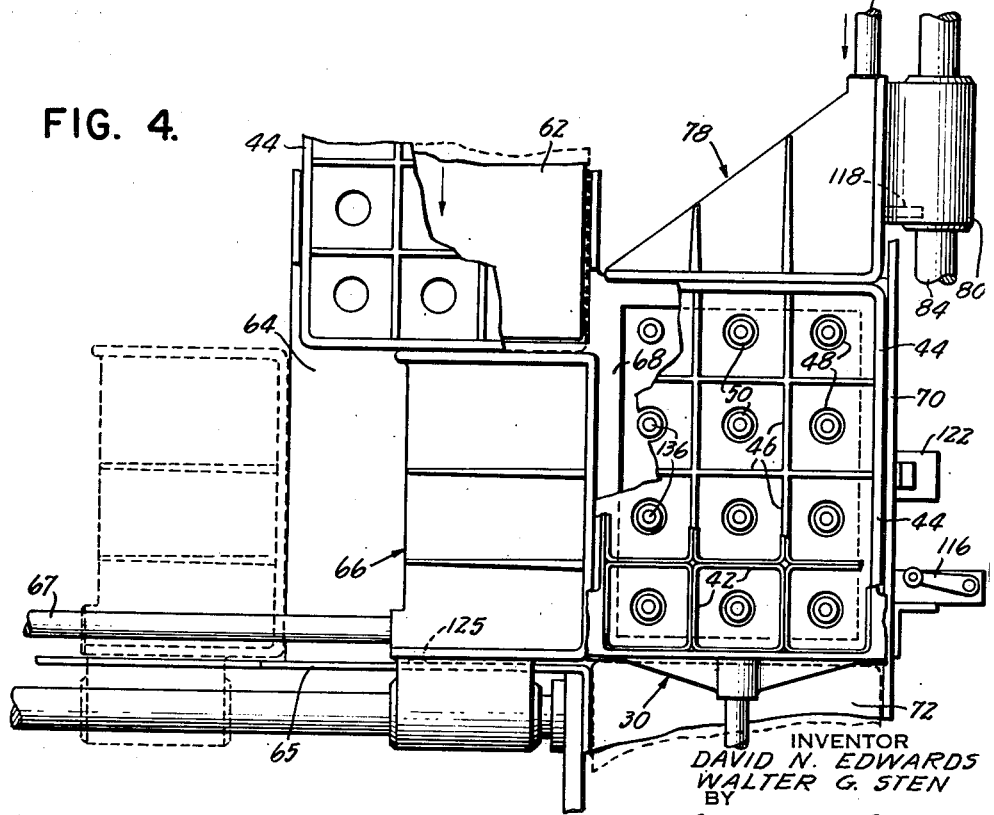

The support guide 30 is divided by longitudinal and transverse grid, forming guiding partitions 42 corresponding to the number of bottles in a case-filling assembly. This grid-like arrangement, when in bottle-guiding position, registers with the bottle separating spacers 46 of a bottle shipping case 44 beneath the support guide 30. The partitions 42 of the guide rack 30 also lie directly under the walls 18 when the guide rack 30 is in bottle-guiding position. The guide rack 30 is shown in bottle-supporting position in Figures 1 and 3, and in guiding position in Figure 4.

The case 44 used with the casing machine of the present invention requires an opening 48 beneath each bottle compartment, these openings being provided to permit the reciprocation therethrough of fingers 50, which are projected upwardly through the openings 48 to ease the bottles down into the case. The upwardly projecting fingers 50 are mounted in a base 52 slidable on vertical guide rails 56.

A piston rod 58 of pneumatic motor 60 is connected to the base 52 to raise the fingers 50 into bottle-supporting position and then, when a case-filling assembly of bottles is resting thereon, to lower the bottles gently to the bottom of the case 44, the downward movement of the fingers 50 continuing until the upper ends of the fingers have cleared the outside bottom face of the case, so that the loaded case may then be ejected horizontally.

It is important, of course, that a case 44 of the construction above specified, be in bottle-receiving position in the machine before the upward movement of the fingers 50 starts. In the embodiment shown, the cases slide down a chute or conveyor 62 which delivers them each in turn onto a table 64 and over this table until it contacts a stop 65.

A pusher 66 on the piston rod 67 of motor 130 (Figure 6) is actuated to push this endmost case, transversely onto a case support 68. This support engages the case 44 along its four bottom margins, but is open for access of the fingers 50. An abutment 70 limits the movement of cases 44 by pusher 66, thus accurately formed as a continuation of the front side wall of the case positioning each case relative to the fingers 50.

Figure 9:
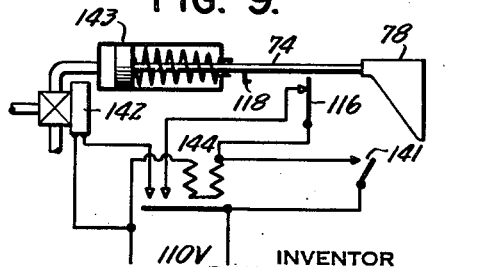

A discharge chute 72 extends from the side of support 68; and a case ejector 78 actuated by a motor 143 (Figure 9) through rod 74 pushes each case in turn onto this chute 72.

Figure 5:
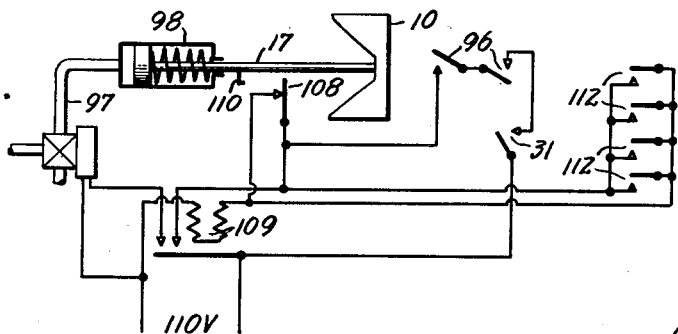

An opening is provided in the end abutment 70 to accommodate ears 80 when sliding on guide rails 84. To prevent operation of the machine if bottles and cases are not feeding smoothly to the assembly, various interlocks are provided which may be mechanical, fluid-pressure or electrical. Thus one interlock is provided to insure that the pusher 10 will not push any bottles into the assembling bays until there is a bottle in front of each bay, and the guide support 30 is in position to support them. The former is accomplished, in the pneumatic system of this embodiment, as shown in Figures 1 and 5 by electric switches 96 which control electrically operated valves in the pressure line 97 to motor 98 (see Figure 5). One such switch 96 is located upon each side of the centering abutment 20 and connected in series so that only when the opposite lines of bottles are pushed against both switches 96, will the valve-actuating circuit be closed and the pusher actuated.

The return of the pusher 10 to its bottle-receiving position normally will be caused by opening switch 108, thus breaking the holding circuit for relay 109 as will be evident from Figure 5. The arm of switch 108 is opened at the end of the pusher stroke by engagement with lug 110 on one of the guide ears 9. Each time the pusher 10 pushes a row of four bottles into the assembling bays it operates through the lug 110 to open the switch 108 to break the holding circuit and cause the return of the pusher to row assembling position, except as hereinafter set forth.

The interlock to prevent pushing bottles into the open guide holes of the grid 30 is provided by a normally open spring contact switch 31 which is engaged by grid 30 or some part connected to it, on its return to bottle supporting position. As shown in Figure 5 this switch 31, being in series with the switches 96, must be closed before the pusher motor 98 can be actuated.

A third interlock is provided to hold the pusher 10 in its extended position for stopping the bottle feeding and closing the ends of bays 16 while the bottles are lowered into the case 44. As herein shown, normally open, parallel connected switches 112 are located at the ends of the bays remote from the pusher 10. These switches are closed when the pusher 10 has completed the assembly of three bottles in each bay and the first bottle introduced into each bay has thus been pushed against its associated switch.

When any of the switches 112 have been closed, it short circuits the switch 108, so that a second holding circuit is established, independent of the opening of switch 108. Thus the pusher 10 is held in the bottle-confining position until the bottles are lowered below the switches 112.

Shifting of the guide rack 30 from its bottle-supporting to its bottle-guiding position should take place in the proper sequence. A solenoid valve 114 insures this by controlling flow of air into a pneumatic motor 120 (Figure 8) connected through the piston rod 38 to the support guide 30. This solenoid valve is energized through a relay having a holding circuit established through a second contact in each of the series connected switches 112, and a fifth switch 124 mounted beneath the case-supporting floor 68 where it is actuated by the base 52 at the top of its stroke. Thus the support guide 30 is moved into bottle-releasing position only when (1) all bays 16 are full, (2) the bottle-lowering fingers 50 are raised, which can occur only after (3) a case 44 is in position to receive the bottles.

Although we have used the reference numerals 112, 116 and 124, to designate switches at the locations indicated, advantageously, as indicated above they are provided with separate sets of contacts so that the circuits represented by the different figures of the drawing are not interconnected at these switches.

We come now to the interlocking of the case positioning means with the case feed and case ejecting means, the bottle feed and the finger reciprocating means. First, by virtue of the case pusher control circuit shown in Figure 6, the pusher 66 will not push a case toward the bottle-receiving position beneath the assembling bays until the case is squared up on the table 64 with its side pressed against abutment 65 (see Figures 1 and 4). On the abutment 65 is located a normally open push button switch 125 so that it is pressed by the middle of a case when pushed against the abutment 65.

The circuit closed by the switch 125 (see Figure 6) actuates the pusher 66 by energizing a solenoid valve 128 through a relay 129 with a holding circuit including normally closed switch 116 opened by lug 118 on the case ejector 78. The air flow through the solenoid valve drives a pneumatic motor 130 which is connected to the piston rod 67.

Figure 6:
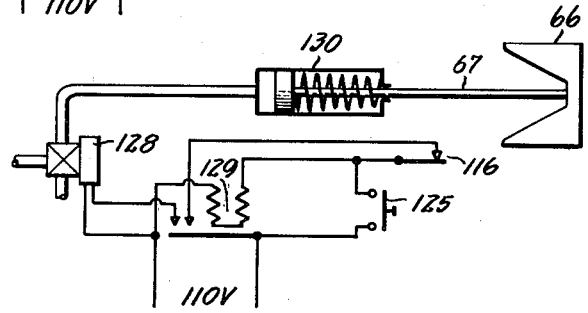

It is advantageous that the pusher 66 remain in its advanced position to prevent misalignment of the case 44 during both filling and ejection of the case. This is assured by the holding connection on the relay 129 through the switch 116 (Figure 6). This keeps the pressure in the motor 130 until the holding circuit is broken when switch 116 is opened by lug 118 at the end of the case ejecting stroke.

Figure 7:
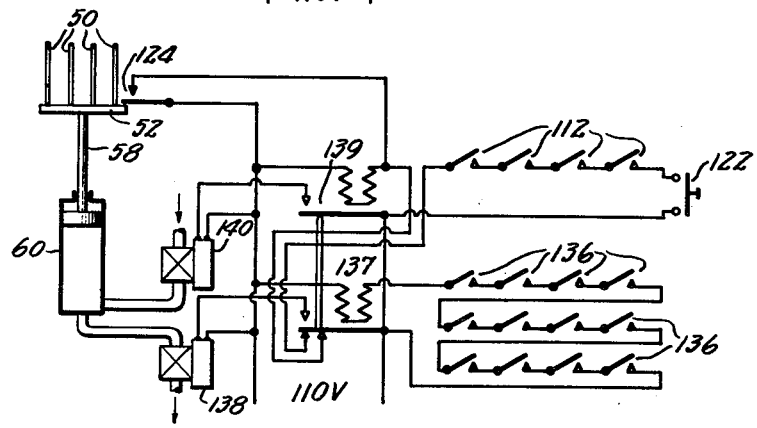

When the case 44 is pushed against switch 122 it energizes the relay 137 of the bottle-lowering control circuit (Figure 7) so that, upon closing all four switches 112, by filling of the bays 16, motor 60 will be supplied with air pressure to lift fingers 50 through the case 44 and the support guide 30 and into supporting relation to the bottles in the bays 16.

Located in the bottle-engaging tip of each finger 50 is a normally open switch 136, all connected in series with the relay 137.

When the fingers, at the top of their travel, engage the bottles, switches 136 will be closed to complete the circuit of relay 137 thus opening the solenoid valve 138 to exhaust cylinder 60. The operation of relay 137 also lifts the insulated contact bridge carried on its armature, thereby breaking the circuit of relay 139 so that the inlet valve 140 is closed. Thus the motor 60 is exhausted to lower gently the fingers 50 carrying the bottles into the case 44. If a bottle should bind in guide 30, its switch 136 would be relieved of its weight and would open dropping relay 137 to close the exhaust valve and closing the circuit of relay 139 to lift the fingers until the stuck bottle is again picked up. This "working" up and down will be continued until the bottle is freed or is worked down to where switch 112 is opened; but the machine cannot continue operation unless all the bottles come down to case 44 on the fingers 50.

When the bottles reach the bottom of case 44 they rest on it and all switches 136 reopen to drop relay 137. This relay or the valve 138 which it controls, is of the delayed type timed so that the dropping of the fingers does not actually stop until they are below the bottom of the case 44, so that the case can be ejected horizontally without catching said fingers.

Although the dropping of relay 137 bridges the contacts at the back of its armature, it cannot reenergize relay 139 until all switches 112 are again closed by filling the bays 16, the bottles cannot be fed into the bays until the guide support 30 is moved to close switch 31, and support guide cannot be moved until its holding circuit is broken at 116 by lugs 118 at the end of the stroke of case ejector 78.

Just before the base 52 and fingers 50 reached the bottom of their travel, normally open switch 141 (Figures 1 and 9) was momentarily closed, thereby energizing the relay to open solenoid valve 142 and operate motor 143 to eject case 44 onto discharge chute 72. The relay is held by a circuit through switch 116.

At the end of its stroke, the case ejector 78 opens switch 116 by lug 118 to drop relay 144, and leave the case ejector retracted until the next cycle.

The closing of switch 116 at the end of the case ejector stroke also opens the holding circuit on the relay of the bottle guide support (Figure 8) to move the grill 30 back into supporting position and thereby reclose switch 31 to close the relay circuit of Figure 5 and start pushing bottles into bays 16. At the same time switch 116 opens the holding circuit of the relay 129 for the case pusher (Figure 6) so that it is retracted ready to push another case into bottle-receiving position.

Thus the cycle is completed ready for start of the next cycle.

From the foregoing description the operation of the machine will readily be understood particularly the operation of those means which insure a proper coordination between a supply to the machine of cases to be filled and a supply to the assembling mechanism of containers or other articles to be cased in suitable order and quantities to provide case filling assemblies.

Although we have shown the several mechanisms as being operated by spring returned piston and cylinder type pneumatic motors and have found advantage therein, it will be understood that other driving means can be used, electrical, mechanical and hydraulic as well as pneumatic; and although solenoid valves are mentioned throughout other types of valve control are available. In general, it will be understood that the invention is not confined to the particular forms or arrangements of parts herein described and that many modifications can be made without departing from the spirit of the invention, the scope of which will be defined in the claims.

Figure 10:
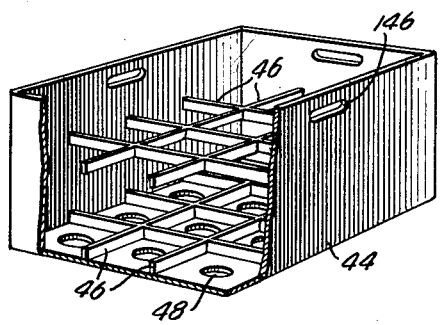
Figure 10 is a perspective view of a case of improved construction, suitable for use with the casing machine of the present invention, one side being partly broken away to show better the interior structure.
Figure 11:
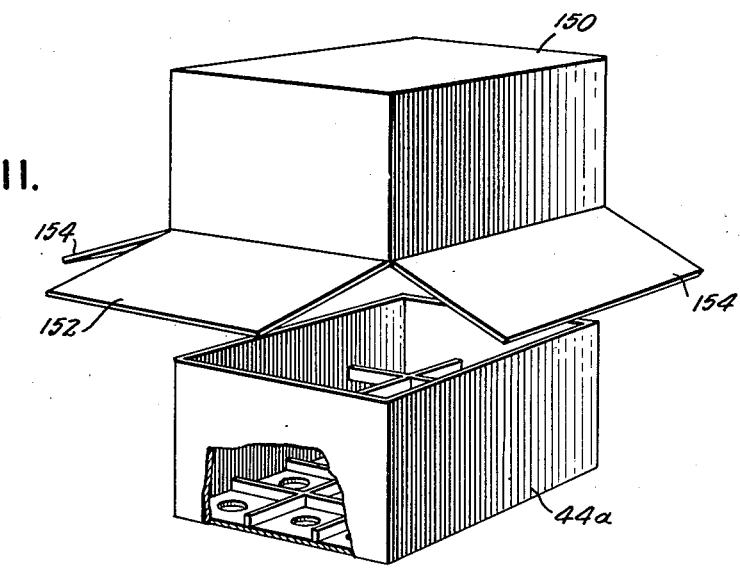
Figure 11 shows in perspective a modified form of shipping case comprising an inner open case and an outer case with sealing flaps.
Figure 12:
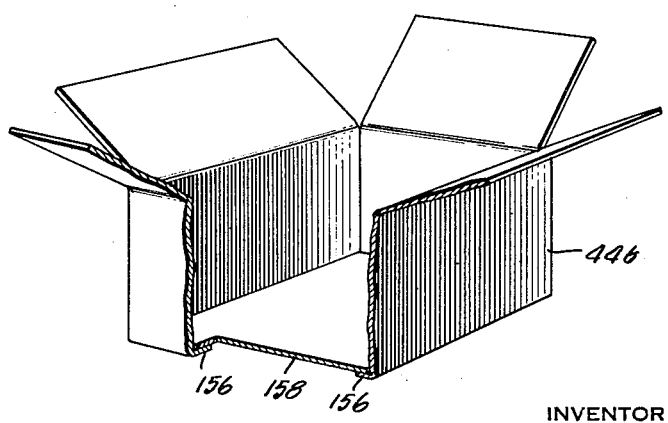
Figure 12 is a perspective view of a modified outer case with a removable bottom and sealing flaps.

Although the machine is usable with cases made in the usual form and of usual materials, such cases being ordinarily provided with openings through their bottoms through which the fingers 50 may reciprocate, we have shown in Figures 10, 11 and 12 cases of improved construction and materials which make them better suited to the casing of container and other articles of the character of those for the handling of which this machine is particularly designed.

The case shown in Figure 10 is similar in overall design to the standard shipping case used in the dairy, brewing and carbonated beverage industries, except for the bottom which is provided with the holes 48, preferably round and necessarily somewhat smaller than the containers which go into the respective compartments, defined by the separator 46. The case differs further from the standard shipping case in the material of which it is composed which contributes both the facility of manufacturing the case to its length of life and to the effectiveness of its protection of the containers or other articles shipped therein.

The preferred material from which the case may be molded into the shape shown in Figure 10 is felted glass fibre having its surfaces sprayed with a tough, flexible or semi-flexible resin which will result in an impervious permanent and sanitary surface having high strength and reinforced and cushioned by the resilient fiber pad interior. The separators 46 should also be made of the same material to provide additional shock protection for the containers.

In Figure 11 is shown an inner case 44a of construction of strawboard kraft or other carton material of form similar to that shown in Figure 10, except for omission of the hand holes 146 and the usual stacking lugs 148, this case being intended to be enclosed in outer carton or shipping case 150 when filled. This outer case 150 is designed to receive and confine the inner case and the contents thereof as, for example, by placing the outer case over the inner case and closing the end flaps 152 and side flaps 154 under the bottom of the inner case. The case 150 may be made of the same material as the case shown in Figure 10.

In Figure 12, is shown a shipping case 44b, which may be formed of material similar to that used for the case shown in Figure 10, this case having molded on the lower edges of its sides inturned flanges 156 which support a removable bottom 158. This case may be open top or may be provided with top closing side and end flaps respectively. The case is intended for use with containers not requiring individual compartment protection.

We claim:

1. In a casing machine, the combination with a case constructed to receive and hold in predetermined relation to each other a plurality of articles of substantially uniform shape and dimensions lowered thereinto, of means for assembling said articles in approximately such predetermined relationship above said case to be released for lowering thereinto and article lowering means comprising means reciprocable through the bottom of said case, when said case is in article-receiving position, and having an upstroke movement which brings said means into position immediately below the bottoms of the articles assembled above said case and a downstroke movement so governed that the speed of gravitation of said articles into said case is retarded and controlled by said means, the article lowering means also comprising appropriately spaced individual supports for the respective articles and the case having correspondingly spaced openings in its bottom through which said individual supports may reciprocate.

2. Container assembling mechanism comprising a container row assembling table over which containers fed to said table may be pushed in succession by the pressure of containers behind them in the feeding line, a row pusher movable across the table transversely to the direction of container feed movement, a centering stop to position the containers assembled in front of said pusher, means for actuating said pusher, and transverse container row assembling bays in position to receive the containers pushed across said table by said pusher, container feeding lines being arranged to feed containers to opposite ends of the row assembling table and the stop on the pusher being so located as to permit containers from both feed lines to be moved in front of it.

3. Container assembling mechanism according to claim 2 in which means upon each side of the pusher stop, each arranged to be engaged by the endmost container pushed thereagainst by the feed line upon its side of the stop, are so operatively interconnected with each other and with the pusher actuating means as to require a complete row assembly in front of the pusher before it is actuated.

4. Container assembling mechanism according to claim 2 in which the pusher has container feed intercepting sides which move into feed intercepting position on each pushing stroke of the pusher and means at the ends of the transverse row assembling bays remote from the pusher are arranged to be engaged by the endmost container of a completed transverse row assembly and have operating interconnections with each other and with the pusher actuating means which cause the pusher to be held at the end of its pushing stroke when the assembling bays are filled.

5. A container casing machine for use with cases having openings in their bottoms beneath the respective containers cased therein, said machine having container lowering means comprising container supporting fingers reciprocable through the case bottom openings between a position in which they may be engaged by and support the containers at points considerably above the case bottom and a position in which they clear the case openings after depositing the containers upon the case bottom, and means for effecting such reciprocation, guides for the respective containers being located above the container receiving case in position to guide the containers into engagement with the upper ends of the respective fingers.

6. A container casing machine according to claim 5 in which the container guides are formed in a guide rack shiftable between container supporting and container guiding positions.

7. A container casing machine according to claim 6 in which partitions above said guide rack form container row assembling bays and are located to cooperate with the guide rack to maintain the containers over the supporting parts thereof when said guide rack is shifted into container supporting position.

8. A container casing machine for use with cases having openings in their bottoms beneath the respective containers cased therein, said machine having container lowering means comprising container supporting fingers reciprocable through the case bottom openings between a position in which they may be engaged by and support the containers at points considerably above the case bottom and a position in which they clear said case openings after depositing the containers upon the case bottom, means for effecting such reciprocation, case positioning means comprising a case feed line, a table over which the endmost case of said line may be pushed by the pressure of cases behind it, a stop limiting the movement of said case over said table, a pusher movable over said table in a direction transverse to the case feed movement and in front of which the endmost case is located by said stop, a support for supporting the case in container receiving position and onto which the case pusher may push said endmost case, case locating means associated with said case support including a stop against which said pusher pushes said endmost case and means controlled in its actuation by the presence of a case in appropriate position in front of said pusher for causing said pusher to push said case upon said support and against said support stop, means located on the case support stop and engageable for operation by the case pushed thereagainst governing both the upstroke of the case lowering mechanism and means for holding the case pusher in the position reached by it at the end of its case-pushing stroke, said pusher having a case feed line stop side brought into position by the pushing stroke.

9. A container casing machine for use with cases having openings in their bottoms beneath the respective containers cased therein, said machine having container lowering means comprising container supporting fingers reciprocable through the case bottom openings between a position in which they may be engaged by and support the containers at points considerably above the case bottom and a position in which they clear said case openings after depositing the containers upon the case bottom, means for effecting such reciprocation, case positioning means comprising a case feed line, a table over which the endmost case of said line may be pushed by the pressure of cases behind it, a stop limiting the movement of said case over said table, a pusher movable over said table in a direction transverse to the case feed movement and in front of which the endmost case is located by said stop, a support for supporting the case in container receiving position and onto which the case pusher may push said endmost case, case locating means associated with said case support including a stop against which said pusher pushes said endmost case, means controlled in its actuation by the presence of a case in appropriate position in front of said pusher for causing said pusher to push said case upon said support and against said support stop, a case ejector, operable after the casing operation, to present a case locating face for one side of the case pushed upon said support and means governed by the completion of the downstroke of the container lowering means to effect the case-ejecting operation of the case ejector.

10. A container casing machine according to claim 9 in which means operable by the case ejector as it completes its ejecting stroke releases the pusher holding means and permits its return into case feed line releasing position.

References Cited in the file of this patent

UNITED STATES PATENTS

| | | |
|---|---|---|
| 1,592,793 | Webster | July 13, 1926 |
| 1,611,822 | Dulche | Dec. 21, 1926 |
| 2,024,503 | Bickford | Dec. 17, 1935 |
| 2,556,082 | Hartness | June 5, 1951 |
| 2,593,861 | Eder et al. | Apr. 22, 1952 |
| 2,626,079 | Keller | Jan. 20, 1953 |
| 2,643,043 | Okulitch et al. | June 23, 1953 |
| 2,650,009 | Kerr | Aug. 25, 1953 |
| 2,652,180 | Fox | Sept. 15, 1953 |
| 2,657,845 | Smith | Nov. 3, 1953 |
| 2,681,171 | Brown et al. | Jan. 15, 1954 |